United States Patent

Shanks

[15] 3,703,632

[45] Nov. 21, 1972

[54] RECURSION FILTER

[72] Inventor: John L. Shanks, Tulsa, Okla.

[73] Assignee: Amoco Production Company, Tulsa, Okla.

[22] Filed: Feb. 18, 1972

[21] Appl. No.: 227,364

Related U.S. Application Data

[63] Continuation-in-part of Ser. No. 556,744, June 10, 1966, abandoned.

[52] U.S. Cl. ..................235/152, 235/152, 235/156, 235/164, 328/167

[51] Int. Cl. ..............................G06f 7/38, G01v 1/28

[58] Field of Search .235/152, 156, 164, 181, 150.53, 235/150.52; 340/172.5; 328/167

[56] References Cited

UNITED STATES PATENTS

| | | | |
|---|---|---|---|
| 3,639,739 | 2/1972 | Golden et al. | 235/152 |
| 3,651,316 | 3/1972 | Gibson | 235/152 |

*Primary Examiner*—Felix D. Gruber
*Attorney*—Paul F. Hawley

[57] ABSTRACT

This invention concerns apparatus for filtering signals. Means are provided for emphasizing only some of the frequency components of signals with respect to others. The invention has particular application where the signal to be applied to the filter consists of a set of data obtained by sampling the amplitude of the signal at substantially equal time intervals, i.e., digitized data. In this context, I provide apparatus for extremely high speed digital filtering. Automatically the terms in the equation $$y_n = \sum_{i=0}^{i=N} a_i x_{n-i} - \sum_{j=1}^{j=M} b_j y_{n-j}$$

are carried out by recursion, or a combination of feed forward and feed back terms. The quantities $a_i$ and $b_j$ are stored in a register. Values $b_j$ are automatically called out as appropriate, multiplied by the previous values of the coefficient $y_n$, i.e., $y_{n-j}$ (which is the recursive part) and summed, while the coefficients $a_i$ are called out and multiplied by the appropriate value of $x$, then the total summation is made. The apparatus involves both storage means, means for reading out the various values involved, multiplying them together, accumulating them and using a recursive path by which input data can be re-stored in a particular register, as desired.

6 Claims, 6 Drawing Figures

| OPERATION STEP | WRITE CONTROL 16 ADDRESS | READ CONTROL 23 ADDRESS | READ CONTROL 29 ADDRESS | INPUT TRANSFER SWITCH 42 | FILTER TRANSFER SWITCH 43 | SUM TRANSFER SWITCH 53 | CLEAR SUM SIGNAL (LINE 51) | OUTPUT NUMBER |
|---|---|---|---|---|---|---|---|---|
| START | | | | | | | | |
| 1 | 2 | 0 | 0 | □ | □ | □ | ■ | |
| 2 | 2 | 0 | 0 | ■ | ■ | □ | □ | |
| 3 | 2 | 1 | 1 | ■ | ■ | □ | □ | |
| 4 | 2 | 2 | 2 | ■ | ■ | □ | □ | |
| 5 | 2 | 3 | 3 | ■ | ■ | □ | □ | |
| 6 | 2 | 3 | 3 | □ | □ | ■ | □ | 0 |
| 7 | 2 | 1 | 0 | □ | □ | □ | ■ | |
| 8 | 3 | 1 | 0 | ■ | ■ | □ | □ | |
| 9 | 3 | 2 | 1 | ■ | ■ | □ | □ | |
| 10 | 3 | 3 | 2 | ■ | ■ | □ | □ | |
| 11 | 3 | 4 | 3 | ■ | ■ | □ | □ | |
| 12 | 3 | 4 | 3 | □ | □ | ■ | □ | 1 |
| 13 | 3 | 2 | 0 | □ | □ | □ | ■ | |
| 14 | 4 | 2 | 0 | ■ | ■ | □ | □ | |
| 15 | 4 | 3 | 1 | ■ | ■ | □ | □ | |
| 16 | 4 | 4 | 2 | ■ | ■ | □ | □ | |
| 17 | 4 | 5 | 3 | ■ | ■ | □ | □ | |
| 18 | 4 | 5 | 3 | □ | □ | ■ | □ | 2 |
| 19 | 4 | 3 | 0 | □ | □ | □ | ■ | |
| 20 | 5 | 3 | 0 | ■ | ■ | □ | □ | |
| 21 | 5 | 4 | 1 | ■ | ■ | □ | □ | |
| 22 | 5 | 5 | 2 | ■ | ■ | □ | □ | |
| 23 | 5 | 6 | 3 | ■ | ■ | □ | □ | |
| 24 | 5 | 6 | 3 | □ | □ | ■ | □ | 3 |
| STOP | | | | | | | | |

INITIAL EXTERNAL SETTINGS

IW = 2

NF = 4

NS = 4

SWITCH OPEN □

SWITCH CLOSED ■

$$y_n = \sum_{i=0}^{1} a_i X_{n-i} - \sum_{j=1}^{2} b_j y_{n-j}$$

FIG. 5

LET: $u_0 = u_1 = u_2 = 0$ $u_3 = x_0, u_4 = x_1, u_5 = x_2, \ldots$ etc.

$g_0 = -b_2$ $g_1 = -b_1$ $g_2 = +a_1$ $g_3 = +a_0$ $$y_n = \sum_{i=0}^{1} a_i x_{n-i} - \sum_{j=1}^{2} b_j y_{n-j}$$

OPERATION STEP

6
$$u_2 = g_0 u_0 + g_1 u_1 + g_2 u_2 + g_3 u_3$$
$$= -b_2 \cdot 0 - b_1 \cdot 0 + a_1 \cdot 0 + a_0 x_0 = a_0 x_0 = y_0$$

12
$$u_3 = g_0 u_1 + g_1 u_2 + g_2 u_3 + g_3 u_4$$
$$= -b_2 \cdot 0 - b_1 y_0 + a_1 x_0 + a_0 x_1 = a_0 x_1 + a_1 x_0 - b_1 y_0 = y_1$$

18
$$u_0 = g_0 u_2 + g_1 u_3 + g_2 u_4 + g_3 u_5$$
$$= -b_2 y_0 - b_1 y_1 + a_1 x_1 + a_0 x_2 = a_0 x_2 + a_1 x_1 - b_1 y_1 - b_2 y_0 = y_2$$

24
$$u_5 = g_0 u_3 + g_1 u_4 + g_2 u_5 + g u_6$$
$$= b_2 y_1 - b_1 y_2 + a_1 x_2 + a_0 x_3 = a_0 x_3 + a_1 x_2 - b_1 y_2 \; b_2 y_1 = y_3$$

FIG. 6

RECURSION FILTER

CROSS REFERENCE TO RELATED APPLICATIONS

This application is a continuation-in-part of Ser. No. 556,744, John L. Shanks, filed June 10, 1966, now abandoned. Canadian Pat. No. 891,739 (issued Jan. 25, 1972), British Pat. No. 1,140,318 (issued May 14, 1969), and French Pat. No. 1,514,849 (issued Jan. 15, 1968) have been issued on equivalent applications to the above.

BACKGROUND OF THE INVENTION

It has been known in the literature for some time how to obtain a set of data, commonly in binary coded form, by sampling a signal at substantially uniform time intervals. Such apparatus is generically called an analog-to-digital converter. The data may be called digitized signals. It has also been known that, by the use of various design procedures, filters can be employed acting on such data to change the amplitude or phase characteristic of the signal, or both. For example, the article by Golden and Kaiser "Design of Wideband Sampled-Data Filters" (*The Bell System Technical Journal*, Volume XLIII, July 1964, pp. 1546–1553 and references given) discusses techniques which can be used with such digitized signals to design low-pass, band-pass, or high-pass filters of desired amplitude and phase characteristics. In fact, it is possible to design filters of this type which are considerably better than those which can be assembled from reactances and resistances.

Among the various classes of digital filters which have been described in the technical literature, one which is particularly useful is the so-called recursive digital filter. Such filters are of a feed-forward and feed-back type, and are shown, for example, in the Golden-Kaiser reference cited above and elsewhere, for example, the article by Robinson and Treitel "Dispersive Digital Filters" (Reviews of Geophysics, Volume 3, November 1965, pp. 433–461, at p. 445 and following). Such filters acting on a digitized set of input data $x_o, x_1, x_2, \ldots x_p$ produce a set of output data in the sequence $y_o, y_1, y_2, \ldots y_q$ where $$y_n=\sum_{i=0}^{i=N} a_i x_{n-i}-\sum_{j=1}^{j=M} b_j y_{n-j},\ n=0,\ 1,\ 2,\ \ldots,\ q \quad (1)$$

where (1) $x_n$ = $n$th value of some input time series (digitized signals) to be filtered.

(2) $y_n$ = $n$th value of the filter output series.

(3) $a_i$, $b_j$ are the filter coefficients for some particular filter. $a_i=0$ for $i>N$. $b_j=0$ for $j>M$.

(4) The output values are computed in the sequence $y_o, y_1, y_2, y_3, \ldots$.

(5) $x_n$, $y_n$, $a_i$, and $b_j$ are all zero for $n$, $i$, and $j$ each < 0.

The primary advantage of such recursion filters lies in the speed of application. For example, digital filtering is usually most conveniently carried out by some type of simple computer. Convolution of the input data with the straightforward filter characteristic desired might, for example, involve dozens to hundreds of multiplication and summation operations for each output data point. On the other hand, when using the feed-back principle expressed in equation (1), it is possible to minimize the filtering time since a minimal amount of computation need be done using both terms of this expression.

Convolution, as used in this connection, is the process involving the operation of multiplication and summation of two sets of numbers. For example, if we have a first series of numbers $d_o, d_1, d_2, d_3, \ldots d_n$ and a second set $e_o, e_1, e_2, e_3, \ldots e_n$, the convolution of these data produces a third series of numbers $f_i$, where $f_i$ equals $$f_i = d_o e_i + d_1 e_{i-1} + d_2 e_{i-2} + \ldots + d_i e_o \quad (2)$$

This can be expressed more compactly as $$f_i=\sum_{s=0}^{i} d_s e_{i-s} \quad (3)$$

This is shown, among other places, in the article by Robinson and Treitel "Principles of Digital Filtering," *Geophysics*, Volume XXIX, June 1964, pp. 395–404.

I have found that it is possible to set up a special form of recursion filter of novel design which reduces substantially to a minimum the amount of convolution and summation required to produce a desired filtering effect on digitized input data. It is an object of this invention, therefore, to reveal apparatus for recursion filtering, for example, by use of digital computer apparatus operated in a special and novel fashion.

The two sets of filter coefficients, namely, the *a* and *b* coefficients in equation (1), are chosen by ordinary digital filter theory, and as such, do not constitute part of this invention. Such theory is, for example. found in the reference to the Golden and Kaiser article given above. However, an example may make the speed of recursion filters apparent. Consider the recursion filter $$y_n = x_n - x_{n-1} + 0.99\ y_{n-1} \quad (4)$$

If the data points $x_n$, any one of which is hereinafter referred to as $x_i$, be the amplitudes of an electric signal sampled at intervals of one millisecond, the application of the recursion filter set out in equation (4) will filter this signal, the filter having the amplitude response characteristic shown in FIG. 3. This is the characteristic of a high-pass filter, which in this instance can be used to remove the steady state or direct current component from an electric signal of any sort, for example, that representing the response of a geophone to earth vibration, It is seen that the recursion formula for this filter requires one multiplication and three summing operations per output value. In order to realize this same filter using the standard convolution procedure, the data would have to be convolved with a filter operator of about 250 points. This, in turn, would require performing this number of multiplications and additions for each output point. It is immediately apparent that a tremendous saving in time is realized by use of the recursion type filter.

A second example of recursion filter is seen in connection with FIG. 4. Again the input data is a set of digitized values of a signal obtained using a sample interval of 1 millisecond. The filter transform equation is written in this same figure. Using simple convolution, this filter would require approximately 80 multiplications for each output point. However, using recursion filtering, such filter can be realized with only 14 multiplications per output point. The particular filter characteristic band-pass in this case, happens to be one which is useful, among other applications, in removing low and high frequency components from the output of a geophone used in seismic prospecting.

General information on obtaining the filter coefficients for recursion filters is found in my paper "Recursion Filters for Digital Processing," *Geophysics*, Volume XXXII, No. 1, Feb. 1967, pp. 33–51, and references given. Further information along the same line is found in my paper "Use of a Digital Convolution Device to Perform Recursive Filtering and the Cooley-Tukey Algorithm," IEEE TRANSACTIONS ON COMPUTERS, Volume C-17, No. 10, October 1968, pp. 943–949.

SUMMARY OF THE INVENTION

This invention involves a discrete convolution device, so organized that its output can be fed back to the input in a particular fashion. The device uses two storage mediums, one which contains the values of the filter coefficients and the other which initially contains the input data values and (later) the computed output data values. Starting the device causes it to convolve the filter coefficients with the input data values. As each output value is computed, the device stores that value back into a specific selected location in the input data storage. This causes the device on each new cycle of operation to convolve previously computed output values with the filter coefficients, along with the remaining input values. The device is controlled by an operation sequence controller, which directs the signals through the various paths and keeps track of the number of operations to be performed. Once started, the device will continue performing its operations cyclically until the desired number of output values are computed. The sequence of operations is such that the mathematical steps described in equation (1) are applied automatically to the input data using the filter coefficients stored in the device. Before starting the device, the input data must be stored, the filter coefficients put into a separate storage, and three constants set into the machine. Those constants are related to the total number of filter coefficients, the number of b coefficients, and the number of output values desired.

BRIEF DESCRIPTION OF THE DRAWINGS

FIG. 5 illustrates how the device of FIGS. 1 and 2 is used to filter a sequence of input data $x$ with the filter equation $$f(z)=(a_o+a_1z)/(1+b_1z+b_2z^2)$$

FIG. 6 further illustrates how the device is used to apply the above filter.

DESCRIPTION OF THE PREFERRED EMBODIMENT

Figure 1:
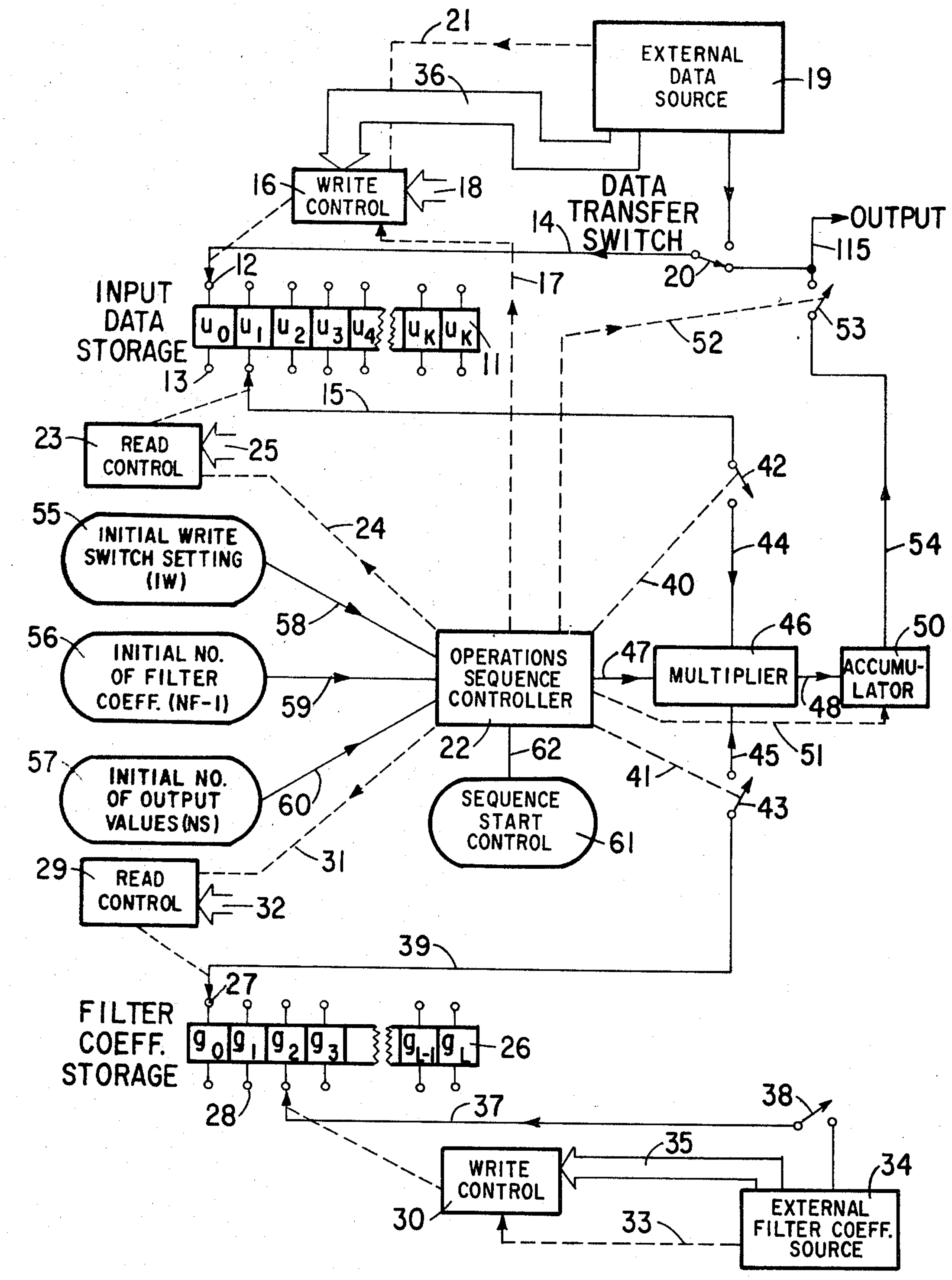
FIG. 1 shows in diagrammatic form a set of apparatus capable of carrying out equation (1) to filter digitally input data and produce an output consisting of a set of digitized values or data with greater rapidity than is possible with an ordinary recursion filter, that is, one programmed in a general-purpose computer.
Figure 2:
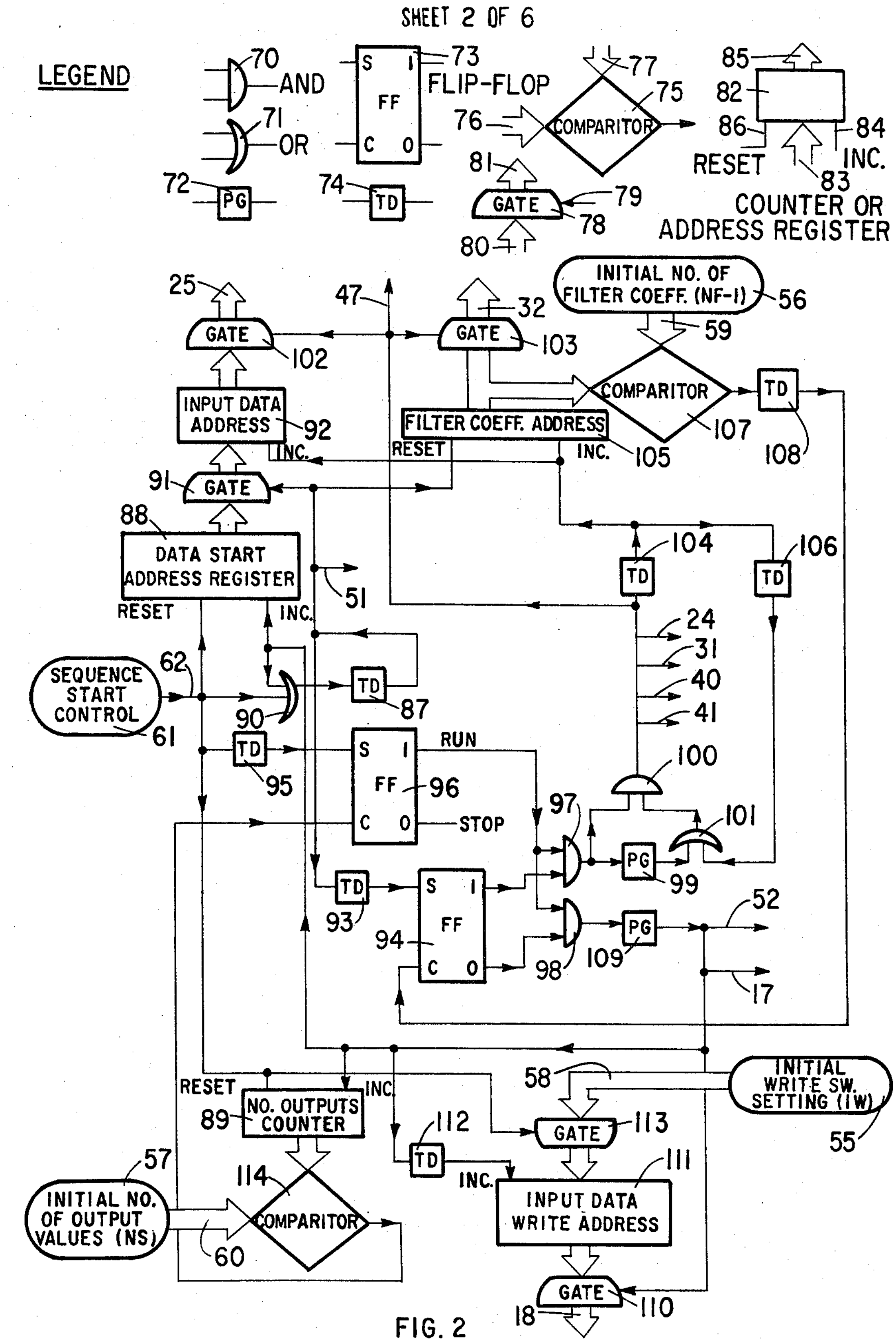
FIG. 2 illustrates in greater detail a set of apparatus interconnected to form an operation sequence controller.
Figure 3:
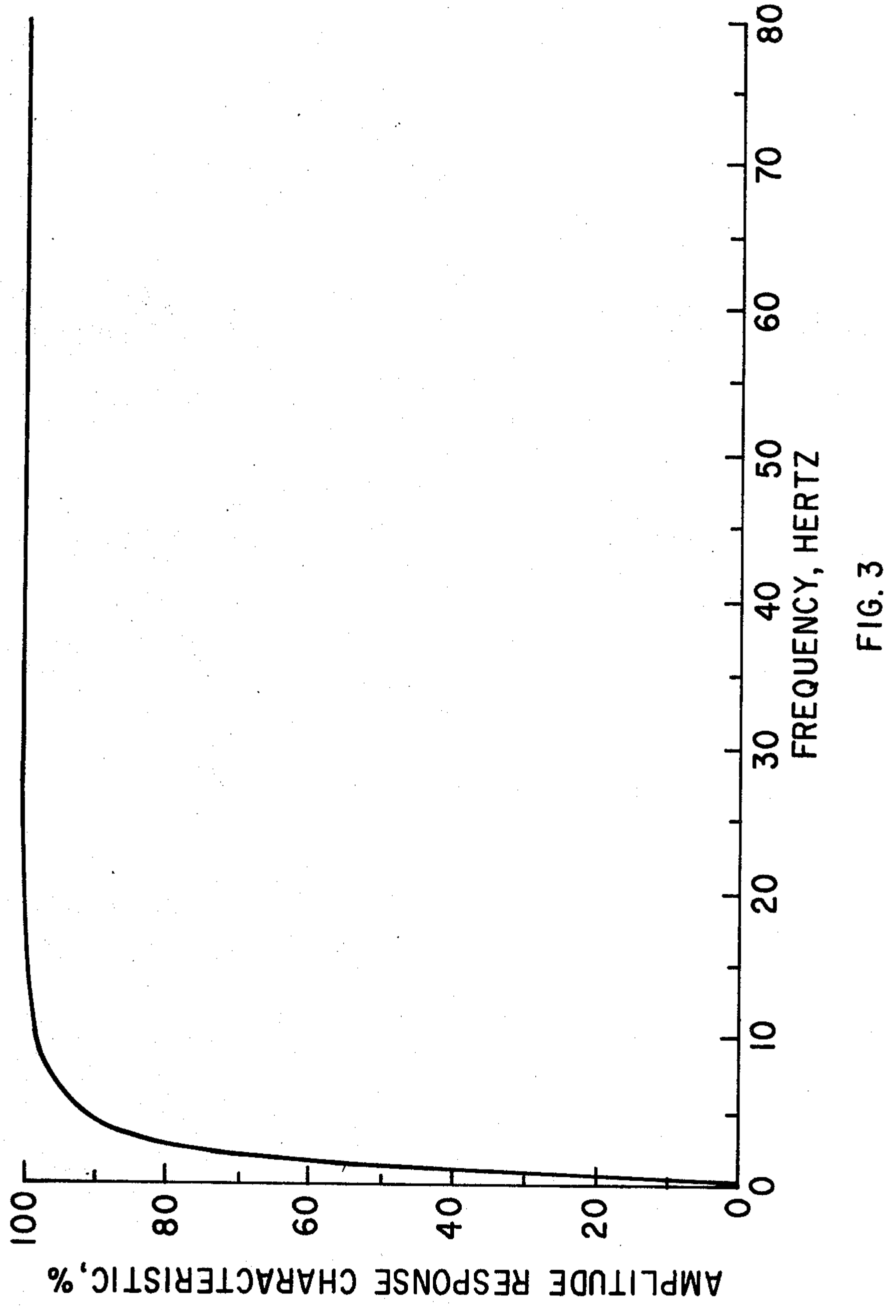
FIG. 3 shows the amplitude response characteristic of a recursion filter constructed in accordance with my invention as a high-pass filter.
Figure 4:
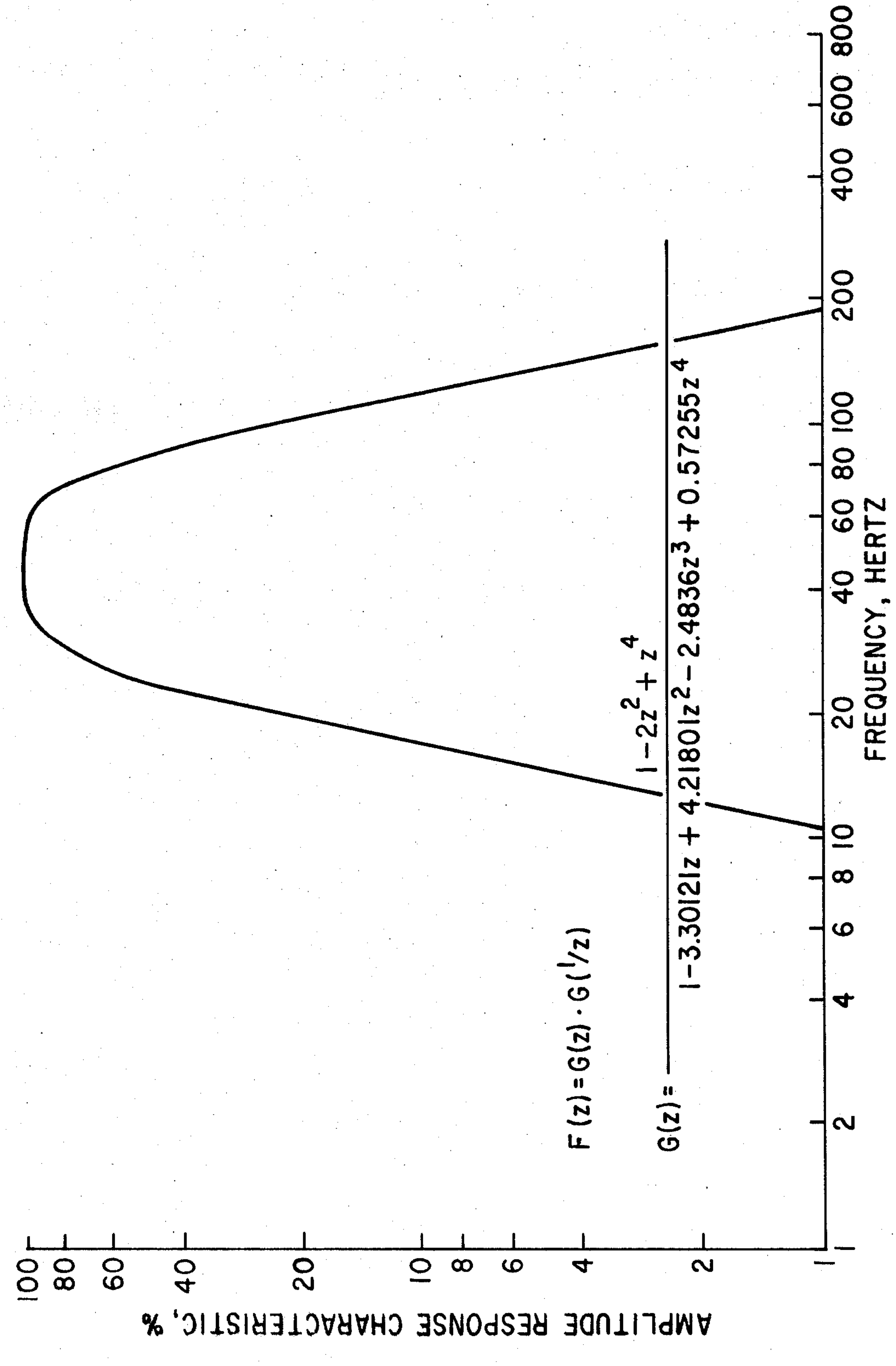
FIG. 4 is an equivalent amplitude response characteristic of a band-pass filter.

In order to show how the system represented by equation (1) can be physically realized in the apparatus, reference is made to FIGS. 1 and 2. It is assumed that by well-known analog-to-digital converters, the input signal has been sampled to produce a set of input data $x_o, x_1, x_2, \ldots x_p$, the sampling being at substantially equal time intervals. This data is to be stored in an input data file storage 11. Such storages are well known in the field of modern computers and may be electromagnetic, electronic, or the like. Each is characterized by the fact that one can "write in" or store a set of digits constituting a number (ordinarily in binary code) in a particularly selected storage cell with a designated address. This number can be subsequently retrieved as described. The particular electric configuration used for such arrangements is complex to show in its entirety, but again is well known. See, for example, *Computer Architecture* by Caxton C. Foster, Von Nostrand-Rineholt Company, 1970, pp. 58–65, the section " Coordinate Address Storage," which completely describes several types of electromagnetic storage. Another reference to a different type is found in the brochure "Silicon Gate MOS LSI RAM 1103," which describes a fully decoded random access dynamic memory containing 1024 bits. This brochure was published by the Intel Corporation, 3065 Powers Avenue, Santa Clara, Calif. It may be noted that on page 13 of this 16-page brochure is shown in FIG. 2 an application of this random access memory device to form a complete memory system, including addressing and retrieving from a memory cell at any point in the memory.

In FIG. 1, the input storage device 11 is shown as having a plurality of individual blocks $u_o, u_1, u_2, \ldots u_k$, each of which symbolically represents one memory cell in the storage unit, capable of containing the complete stored information for one value. This cell is shown as having an input access point, such as 12, and an output access point, such as 13, which permits data coming in on line 14 to be stored in one particular cell, where upon command, it may be read out onto line 15 in the form of a suitable set of binary electric signals.

A write control 16 controls access to the various cells $u_o$, etc., of the input data storage 11. In FIG. 1 this is shown symbolically as adjusting the position of a switch to an input access point 12 leading into the memory cell unit. In fact, the switching arrangement is much more complex. In order to store a value into a particular preselected location (address) in the input data storage device 11, this address in write control 16 opens appropriate gates in the input data storage 11 and allows the input value on line 14 to be stored in the preselected memory cell at the preselected location. Such a write control unit is illustrated in FIGS. 1 and 2 on page 13 of the Intel brochure. The unit in FIG. 2 is called control and timing logic, and includes the basic timing generator shown in FIG. 1. The address latch is also part of the write control, also shown in FIG. 2 of that reference. In my invention, a single pulse from the operations sequence controller 22 on line 17 initiates the write control action which opens a gate into a selected memory cell, such as $u_1$, in accordance with the address imposed on the write control 16 from channel 18. The signal on line 17 and also that on channel 18 both come from the operation sequence controller 22, as is more clearly shown in FIG. 2. The action of opening the gate to the selected memory cell is symbolically shown in FIG. 1 by the motion in the switch on line 14 to the one and only one preselected access point 12 going to that particular memory cell in unit 11. This permits storing the data then present on line 14 in that particular preselected unit memory cell. Initially, external data $x_o, x_1, x_2, \ldots x_p$ is serially presented to line 14 from the external data source 19, the switch 20 (which in reality is a set of gates functioning as a single-pole, double-throw switch) being connected in the upper position to unit 19. The external data source 19 is some device separate from this, such as a card reader, tape deck, a computer, or the like, which is used to store sets of input data prior to their being filtered. When the switch 20 is in the upper position, the write control 16 is under control of the external data source 19, which sends out a pulse through line 21 to the write control 16 at each time when a value from the external source is ready for storing in the input data storage 11. Line 17 is inactive at this time. More completely, the external data source 19 furnishes both an actuating pulse on line 21 and additionally an address on channel 36, which for each piece of external data is the address in which that particular value of external data is to be stored in the input data storage 11. At this time, of course, channel 18 is inactive. This loading function can be performed easily by a suitable general-purpose computer or special-purpose device designed to load data into an input data storage.

A read control 23 used to control the readout of the data that have been stored in the memory cells of input data storage 11. Conceptually, the read control 23 positions the multithrow switch connected to line 15 to one of the contacts 13, permitting the data stored in one memory cell to be read out onto line 15. Physically, the read control 23 can be identical with the write control 16, with an initiating pulse coming to this unit from the operation sequence controller 22 via line 24 and a channel 25 which furnishes location data for suitable actuation of the gate, which upon the actuation of pulse 24 closes the appropriate contact 13 of input data storage 11 to line 15.

A second storage unit 26 is required. Physically it may be a continuation of the input data storage unit 11. It too contains input contacts 27 and output contacts 28, permitting data to be selectively stored in the individual memory cells and to be selectively read out upon operation of the appropriate read control 29 and write control 30. Read control 29 and write control 30 physically are the same kind of units as write control 16 and read control 23.

Read control 29 is actuated through line 31 by the operation sequence controller 22. It is also furnished with channel 32 from the operation sequence controller 22 (see FIG. 2), which controls the selection of the individual memory cell (such as $g_o, g_1, g_2$, etc.) into which the individual filter coefficients are to be stored. Write control 30 similarly is initiated through line 33 from the external filter coefficient source 34, which is a unit functionally exactly of the type as the external data source 19. This external coefficient source 34 has a channel 35 which generates along with each external filter coefficient signal an address signal, which is imposed on the write control 30 to locate the appropriate contact 28 for the unit cell in which a particular designated filter coefficient is to be stored. The storage itself goes through a line 37, and the filter coefficient transfer switch 38 (which physically is an arrangement of gates) arranged at the time when the source 34 is in operation to be closed in the bottom position.

The sequence of storage of external data and of the filter coefficients in the memory cells of the storages 11 and 26 will be discussed subsequently.

As will be subsequently discussed, the sequence of operations after the input data and filter coefficients have been stored is for the operation sequence controller 22 to actuate the read controls 23 and 29 to cause one value of the input data storage to be present on line 15 and a corresponding value filter coefficient to be on line 39 simultaneously. At the same time, the operation sequence controller 22 through lines 40 and 41, respectively, has closed the input transfer switch 42 and the filter transfer switch 43. (As is true of the other switches shown in this FIG. 1, physically each such transfer switch is a gate). Accordingly, the two values are on lines 44 and 45, and are thus presented to the multiplier 46, which is, in turn, controlled from the sequence controller 22 by the actuating line 47. The multiplier used in this device is one which accepts the two input values and supplies as output the product of those two values in binary code. Both the input to and the output from multiplier 46 will be in binary code. The output is on line 48. Such multipliers have been described repeatedly, for example, in *Logic Design of Digital Computers* by Montgomery Phister, Jr., John Wiley & Sons, New York, 1959, pp. 295–316.

Unit 50 is an "accumulator," the function of which is to accept each product from the multiplier 46 via line 48 and to add it algebraically to all previous products in this unit since the last time this unit was cleared to zero. Physically such a unit is described in *Digital Computer Technology and Design* by Willis H. Ware, Vol. II: "Circuits and Machine Design," John Wiley & Sons, Inc., New York, 1963, pp. 11.46 to 11.50.

Periodically the accumulator 50 is cleared automatically by the operation of sequence controller 22. To do this, an actuating pulse is sent out on line 52 which closes the sum transfer switch 53. This dumps the contents of accumulator 50 through line 54. (Actually, switch 53 is another gate.) A short time later a pulse is sent out on line 51, the clear sum line, which thereafter sets the value of this accumulator to zero.

There are three units, the initial write switch setting (IW) 55, the initial number of filters coefficient (NF–1) 56, and the initial number of output values (NS) 57, which operate on the operation sequence controller 22. These ordinarily are identical units, operating through lines 58, 59, and 60, respectively, to set the initial characteristics of this controller 22. Functionally, these elements contain control addresses which are set before starting the operation of the device. The address IW determines the storage location in the input data storage 11 into which the first output value is stored. The address IW is also identical to the number of $b$ coefficients in the recursion filter equation (1). The address NF–1 controls the total number of filter coefficients to be read from the filter coefficient storage. NF is numerically identical to the total number of filter coefficients of the recursion filter in equation (1). NS determines the number of output values which are computed by the device. These constants may be specified in various ways. In a convenient embodiment, these constants could be set into switches on a control panel of the instrument. In another embodiment these constants could be set into digital registers by an external computer before starting the filtering operation. Physically, any of the three units 55, 56, and 57 can be a unit called a data switch. Such units are described in the catalog "Digiswitch Miniswitch" of The Digitran Company, 855 South Arroyo Parkway, Pasadena, Calif. For example, the Series 300 switch on page 8 of this brochure, using circuit logic described in Table 57 on p. 47, may be employed.

The sequence start control 61 is the conventional means for starting sequence controller 22, which takes place through line 62. Accordingly, this unit, in response to an input signal or an operator touching a button, places a brief electric pulse on line 62. Before actuation of the sequence start control, the external data have been loaded into the input data storage 11, the filter coefficients have been placed in storage 26, and the appropriate addresses have been loaded into units 55, 56, and 57.

The description of the operation sequence controller 22 is illustrated in greater detail in FIG. 2, along with units 55, 56, 57, and 61. As is conventional in such a wiring diagram, a legend has been appended showing the various individual electronics. Thus, unit 70 is an "and" gate, that is, a unit which gives an output when a signal is present on both the input lines. Unit 71 is an "or" gate which gives an output when there is a signal on either of its input lines. The pulse generator 72 is a unit which puts out a short controlled pulse of electricity when a signal of predetermined amplitude is applied to its input. The flip-flop 73 (also called a latch) is a unit which presents a signal on one of the two (but not both) output leads (marked 1 and 0), and upon a signal appearing on the other one of the input lines S or C, the device "flips" and applies a signal to the other of the two output lines which previously was not energized. More specifically, when an actuating signal is applied to the S input terminal, a predetermined output signal appears on output terminal 1 essentially instantaneously. Then when a signal is applied to terminal C, an output signal appears on output terminal O, and that on terminal l disappears. The time delay 74 produces an output pulse a fixed predetermined period of time after a signal has been applied to its input.

The comparator unit 75 has the function of producing an output from the comparison of two input channels (rather than individual signals), such as channels 76 and 77. In other words, when a binary coded signal on channel 76 consisting of the signal 11001 is placed on the comparator 75, and the same signal 11001 is present on channel 77, an output is produced by the device immediately and automatically. Any other signal on one channel produces no output from the comparator 75. Such a comparator is described, for example, in the Fairchild TTL Family (catalog) of October 1970, on page 21, as a five-bit comparator.

The gate 78 is in actuality simply a multiplicity of simultaneously actuated individual gates (which have been described many times), one for each line in the channel 80, which are actuated in coincidence. The gate 78 is essentially a switch having off and on characteristics, depending upon the presence or absence of a signal on the initiating line 79. If this signal on line 79 causes the gate to be open (equivalent to closing a switch), a binary coded signal on a channel 80, which is an input to the gate, appears on the output channel 81. On the other hand, if the gate is in the off position, no part of the signal on channel 80 is passed to channel 81.

The counter, or address register 82, contains a binary coded address. This address is determined by the signal at the input channel 83 and the increment line 84. When an address is presented to the register 82 via the input channel 83, that address is set into the register 82 and will remain there until changed. It can be changed by setting in a new address via input channel 83 or by incrementing the present address by an increment signal on line 84. Each occurrence of the increment signal on line 84 causes the address stored in the register 82 to be increased by one. The address in the register 82 is available as output channel 85. The counter or address register 82 is, for example, described in The Integrated Circuits Catalog for Design Engineers, Texas Instruments, Inc., Catalog CC–401. It is a unit of circuit type SM–54160 through SM–54163, or the like, referred to as a synchronous four-bit counter. In such unit the input channel 83 consists of terminals 3 through 6, the output channel 85 is terminals 14 through 11, the reset 86 is terminal 1, and the increment line 84 is terminal 2. A reset line 86 is also present. A signal applied to line 86 causes the register to go to zero.

Both "and" and "or" gates are very well known and merit no description at this state in the art. This is likewise true of pulse generators, flip-flops, and time delays.

The sequence start control 61 initiates the action of the operations sequence controller 22. Once started, the operations sequence controller 22 continues until the desired number of output values have been computed. When that number is reached, the operations sequence controller 22 automatically stops. Refer to FIG. 2. The pulse from the sequence start control 61 on line 62 goes to several locations in the operations sequence controller 22. These locations are the "or" gate 90, time delay 95, data start address register 88, No. outputs counter 89, and address gate 113. The data start address register 88 and the number of outputs counter 89 are identical; their function has been described with reference to address register 82. The pulse from the sequence start control 61 causes the data start address register 88 and the number of output counters 89 to be set to zero. The pulse at the input of address gate 113 allows the address IW number initially set on unit 55 to be passed from the channel 58 into the input data write address register 111. This register needs no reset arrangement because the opening of gate 113 impresses on register 111 the digitized address present on unit 55. The initiating pulse goes to "or" gate 90 from there to time delay 87. This time delay is adjusted to allow sufficient time for the data start address register 88 to complete its reset operation. From time delay 87 a pulse is sent to address gate 91, time delay 93, filter coefficient address register 105, and the clear sum line 51. The pulse on clear sum line 51 causes the sum in the accumulator 50 (FIG. 1) to be set to a value of zero. Similarly, the pulse at the reset input of filter coefficient address register 105 causes that register to be set to zero.

The pulse going to address gate 91 causes it to pass the address from data start address register 88 to the input data address register 92. This register needs no reset arrangement, because the opening of gate 91 impresses on register 92 the digitized address present on unit 88. At this time in the operation this address has the value of zero.

The pulse from time delay 87 also goes to time delay 93. Time delay 93 is adjusted to allow time for the address gate 91 to perform its gating function. The signal pulse from time delay 93 goes to the S input on flip-flop 94. This causes a signal to appear at the 1 output and no signal to appear at the O output of the flip-flop 94, which places the operation sequence controller 22 in the "multiply-add" mode.

The sequence start control signal also goes to time delay 95. Time delay 95 is adjusted to allow sufficient time for all the previously mentioned operations to be completed, including the setting of flip-flop 94 into the "multiply-add" mode. The signal from time delay 95 goes to the S input of flip-flop 96, also known as the "run switch." Signal at the s input of flip-flop 96 causes a signal to appear on the 1 output and no signal to appear on the O output of flip-flop 96. This places the "run switch" in the run mode. The signal from the 1 output of flip-flop 96 passes to "and" gate 97 and "and" gate 98. At this time in the operation there will be a signal from the 1 output of flip-flop 94 on the other input of "and" gate 97. This causes a signal to appear at the output of "and" gate 97. Since there is no signal at this time on the O output of flip-flop 94, there will be no output from the "and" gate 98. The output from "and" gate 97 goes to pulse generator 99 as well as "and" gate 100. The signal from pulse generator 99 goes into the "or" gate 101. Therefore, there will be input signals on both inputs of "and" gate 100 and a pulse signal will appear at the output of "and" gate 100. This pulse goes to address gate 102, address gate 103, and lines 24, 31, 40 and 41. This pulse to address gate 102 allows the input data address on unit 92 to be passed through gate 102 onto channel 25 to the input data read control 23. Similarly, the signal to gate 103 allows the filter coefficient address from unit 105 to be passed through onto channel 32 to the filter read control 29. Simultaneously, the signals on lines 24, 31, 40, and 41 cause the input data read control 23 and the filter coefficient read control 29 to read values from the input data storage 11 and the filter coefficient storage 26, respectively, and to transfer those values to the multiplier 46. Simultaneously, a signal is sent on line 47 to start the multiplication and summation operations.

The pulse from "and" gate 100 is also sent to time delay 104. Time delay 104 is adjusted to allow sufficient time for the input data address and filter coefficient address to be passed through to the input data read control 23 and filter read control 29, respectively. The output pulse from time delay 104 goes to the increment inputs on input data adress register 92 and filter coefficient address register 105. This causes the input data address and the filter coefficient address to be incremented by 1. The output pulse of time delay 104 also goes to time delay 106. Time delay 106 is adjusted to allow sufficient time for the input data address and filter coefficient address to be incremented. It also allows sufficient time for the multiplication and summation operation in units 46 and 50 to be completed. The pulse from time delay 106 goes to "or" gate 101 which produces a pulse at the output of "or" gate 101. Since there is at this time a signal on the input of "and" gate 100 from "and" gate 97, the pulse at the other input of the "and" gate 100 will cause a pulse at the output of "and" gate 100. The pulse at the output of "and" gate 100 causes a repeat of the operations described above which include sending new values of input data and filter coefficients to the multiplier. It also causes another multiplication summation operation in which case this new product will be added in the accumulator 50 to the previously computed product. This repeating sequence of operations continues until the filter coefficient address in the register 105 agrees with the value (NF–1). When this agreement occurs, a signal will be produced at the output of comparator 107. This signal passes to time delay 108 which is adjusted to allow the last multiplication-summation operation to be completed. The signal from time delay 108 goes to the C input of flip-flop 94. This causes a signal to appear at the O output and no signal appears at the 1 output of flip-flop 94, thus placing operation sequence controller 22 in the "reset mode." With no signal at the 1 output of of flip-flop 94, there will be no signal at the output of "and" gate 97. This stops the above-described cycle of the reading out of input data values and filter coefficient values and computing the sum of products. With signal from the O output of flip-flop 94 and the 1 output of flip-flop 96 going to "and" gate 98, there will be a signal at the output of "and" gate 98. This produces a pulse at the output of pulse generator 109. The output of pulse generator 109 goes to address gate 110, line 17, line 52, No. outputs counter 89, time delay 112, the increment terminal of data address register 88, and "or" gate 90. This pulse going to address gate 110 allows the input data write address to be passed through to channel 18. The pulse on line 17 activates the input data write control 16. The pulse also passes to the sum transfer switch 53 via line 52. This allows the value in the accumulator 50 to be passed through to the output of the device as well as to be passed back into the input data storage 11 and be stored in the address determined by the input data write address register 111.

The signal from pulse generator 109 also goes to the increment input on No. outputs counter 89. This adds 1 to the value in the No. outputs counter 89. The signal from pulse generator 109 also goes to the increment input on data start address register 88 which causes the data start address to be incremented by 1. The output from pulse generator 109 also goes to time delay 112. Time delay 112 is adjusted to allow sufficient time for the sum value in unit 50 to be stored back into the input data storage 11. The output from time delay 112 goes to the increment input of the input data write address register 111. This causes the input data write address to be incremented by 1. The pulse from unit 109 going to the "or" gate 90 passes through to the time delay 87

The pulse from time delay 87 renews the above-described operations of passing values from the input data storage 11 and filter coefficient storage 26 to the multiplier 46 so that the sum of products may be formed and then stored back into the input storage 11. The only difference in the set of operations to be executed at this time as compared with those performed previously is that the data start address register 88 and the input data write address register 111 have been incremented by 1. This complete cycle of operations continues until the value in the No. outputs counter 89 agrees with the value NS in unit 57. This causes an output from comparator 114. The output from comparator 114 goes to the C input on the flip-flop 96. This causes a signal on the O output and no signal on the 1 output of flip-flop 96. No output on the 1 output line of flip-flop 96 causes all the operations to cease. No further operations will be performed by the device until another signal is sent from the sequence start control 61. Note that at the termination of operations, flip-flop 94 will be in the "reset" mode (signal on the O terminal), where it will remain until a new set of filtering operations is initiated.

To illustrate the operation of the apparatus, it will be assumed that by an analog-to-digital converter the input signal has been time-sampled to produce a set of input data $x_i$ (digitized signals), the sampling being at substantially equal intervals of time. This data is present in the external data source 19. Similarly, the external filter coefficients have been determined and are present in the external coefficient source 34, the order of presentation being first the b coefficients from $b_M$ to $b_1$ (each with a sign opposite to the value of the filter coefficient as determined from the filter equation. Determining filter coefficients can be carried out a number of ways. One way is described in my paper "Recursion Filters for Digital Processing" mentioned earlier, at pages 35 to 49), and then each a coefficient from $a_N$ to $a_o$. The initial write switch setting unit 55 is set numerically to generate the address of the memory cell $u_M$ which is just exactly M units after the address of the memory cell $u_o$ in unit 11. The unit 56 is set at the total number of filter coefficients less one, called (NF−1), that is, at the number M + N. Finally, the initial number of output values unit 57 is set at the number of values $y_n$ which are to be computed. This value may be any integer limited only by the the maximum value of the storage unit 11.

The data transfer switch 20 is closed in the up position and the external data source 19 is initiated to load the values $x_o, x_1, x_2, \ldots x_p$ into the input data storage unit 11 in the memory cells. Preferably $x_o$ is loaded into cell $u_{M+N}$, $x_1$ into $u_{M+N+1}$, etc., and zeros into all cells $u_o$ to $u_{M+N-1}$, and $u_{M+N+p+1}$ to the end of the storage. This is accomplished because the external data source 19 presents an initiating signal on line 21 to write control 16 and simultaneously presents through channel 36 in a serial presentation the addresses of the memory cells, etc., at the appropriate time corresponding to the values of the external data (such as the values of $x_n$) present on line 14. Since the write control 16 has determined the address appropriate for these values, the data are loaded one after another into the storage unit 11.

In an exactly analogous manner, the values of the filter coefficients $b_j$ starting with $b_M$ and ending with $b_1$ (with the proper reversed sign; see above), and then the filter coefficients $a_i$ starting with $a_N$ and ending with $a_o$, are loaded into the filter coefficient storage 26 ($b_M$ being stored in $g_o$, and so on), the filter coefficient transfer switch 38 being thrown to connect the external coefficient source 34 with line 37. At this point, all of the necessary terms have been read into the filtering apparatus, and it is ready to perform the sequence of operations controlled by the controller 22.

The operation of the sequence controller 22 has already been described. Actuation of the sequence start controller 61 automatically throws switch 20 into the bottom position, and opens the filter transfer switch 38. Very shortly switches 42 and 43 are closed. The first set of operations causes the read control 23 to address (or close) line 15 to the contact 13 of the memory cell $u_o$ which contains at this point the quantity zero. At the same time the filter coefficient storage switch, under adjustment of the read control 29 has been positioned so that line 39 is addressed (closed to) the contact 27 at the memory cell $g_o$ containing the term $-b_M$. Thus these two terms are transmitted via lines 44 and 45 to the multiplier 46 where the product of these two terms $\mathbf{o} \times -b_M$ is formed. This product (zero) is passed by line 48 into the accumulator 50. The operation sequence controller 22 now automatically steps the read controls 23 and 29 over one point, and the process is repeated. This time the term $-b_{M-1}$ occurs in multiplier 46 at the same time as the value stored in $u_1$, and therefore these two terms are multiplied together and their product added in the accumulator 50. The process continues automatically until all products of all filter coefficients have been made with the first NF values in storage $u$, that is $u_o$ up to $u_{NF-1}$. The sum of these products, in accumulator 50, is $a_o x_o$. At this point channel 18 from controller 22 connects line 14 to the address $u_{IW}$ by use of write control 16, switch 53 closes, and the sum of products $(a_o x_o u_{IW}$. Now accumulator 50 is cleared by controller 22. Read control 23 is automatically set at $u_1$ (e.g., previous location plus 1) and read control 29 at $g_o$. At this time the address in write control 16 is also incremented by 1. Now the process repeats, still automatically, producing a second sum in accumulator 50 with the ultimate value $+a_o x_1 + a_1 x_o - b_1 y_o$. Just as before, this is stored in cell $u_{IW+1}$. The device keeps repeating this process, incrementing the starting location in storage 11 one position each cycle, until a total of NS outputs has been produced. Then the controller which has been automatically comparing the number of $y$ values with the number output NS from unit 57, stops the cycle.

An output unit such as a digital tape recorder or the like was connected at all times to the output tape 115 as the unit was automatically carrying out the computations, since the values $y_o, y_1, y_2, \ldots y_n$ occur at this point once, and only once, during the computational sequence. So any output tape unit simply records these values one after the other.

It is apparent from this description that the apparatus described above has produced a set of output data in the sequence $y_o, y_1, y_2, \ldots y_q$ from a set of digitized input data $x_o, x_1, x_2, \ldots x_p$ in accordance with equation (1).

The operation of my invention is further illustrated in

FIGS. 5 and 6. FIG. 5 shows the functional state of various switches in the device at certain steps in the operation. It is assumed that the data to be filtered has been placed in the input data storage 11, the filter coefficients have been stored in the filter coefficient storage 26 and the constants IW, NF–1, and NS have been set before operation of the device is started. In the example shown, the device is performing a filtering operation with a simple filter with two a coefficients and two $b$ coefficients. Therefore, the total number of filter coefficients NF is 4. The number of $b$ coefficients is 2. Therefore IW is set to 2. We have assumed that we desire to compute four output values so NS has been set to 4. In order for the device to perform the filtering operation properly, these coefficients must be stored in the filter coefficient storage 26 in the following order: $-b_2$ in coefficient storage location $g_o$, $-b_1$ in coefficient storage location $g_1$, $a_1$ in coefficient storage location $g_2$, and $a_o$ in coefficient storage location $g_3$. The data to be filtered are stored in the input data storage 11 with three zero values placed in the actual data values, that is, the values stored in cells $u_o$, $u_1$, $u_2$, are zero. The first data value $x_o$ is stored in $u_3$, $x_1$ is stored in $u_4$, $x_2$ is stored in $u_5$, etc. After the start of the operation, at operation step 1, the write and read switches are positioned according to the addresses which are transmitted to them by the operation sequence controller 22. Read control 23 and read control 29 addresses are set to position zero, while write control 16 address is set to the position determined by IW, which is 2. At essentially the same time a signal appears on the clear sum line 51 which sets the accumulator value 50 to zero. In operation step 2 the input transfer switch 42 and the filter transfer switch 43 are closed. This allows the first data value stored in $u_o$, which is actually zero, and the first filter coefficient $b_2$ to be passed to multiplier 46. These values are multiplied together and added to the zero content of the accumulator 50. At operation step 3 read control 23 and read control 29 addresses are incremented one position, and another multiplication-summation operation takes place. These operations continue until step 5, when the data value $x_o$ and the filter coefficient $a_o$ are multiplied together and added into the accumulator 50. At this point the filter coefficient address register 105 agrees with the value NF–1, causing the operation sequence controller 22 to go into the reset mode. Therefore in the next step, which is No. 6, the sum transfer switch 53 is closed and the value in the accumulator 50 is stored back into the input data storage 11. This becomes the first output value $y_o$ and is stored back into the address 2 of the input data storage 11. The equation for this operation is shown in FIg. 6. In operation step 7, the clear sum signal is fed to accumulator 50 (i.e., it is reset to zero). At this same time the filter coefficient address register 105 is reset to zero, which is essentially the same as positioning the read control 29 address back to zero. Also the data start address is passed through gate 91 into the input data address register 92. During the reset mode, but previous to step 7, the data start address register 88 has become incremented by 1. This is equivalent to functionally placing the read switch on storage 11 at position $u_1$. In operation step 8, the multiply-add operations resume, thus building a new sum of products in the accumulator 50. At approximately this same time, the input data write address register 111 is incremented, which is functionally the same as making the write control address position 3. These multiply and add operations continue through from steps 8 to 11 until a new sum of products is complete. In operation step 12 the value in the accumulator 50 becomes the new output value $y_1$. The equations for this operation are again shown in FIG. 6. This repeating sequence of operations continues until the number of outputs, which is the desired number 4, has been computed, and the last output value $y_3$ has been stored back into the input data storage address 11. As explained previously in my discussion of the operation sequence controller 22, all operations of the device then cease.

I claim:

1. Apparatus for recursively filtering a set of data $x_o$, $x_1$, $x_2$, . . . $x_p$ in accordance with the recursive filtering formula $$y_n=\sum_{i=0}^{i=N} a_i x_{n-i}-\sum_{j=1}^{j=M} b_j y_{n-j}$$

in which $a_i$ and $b_j$ are filter coefficients, and N and M are positive integers, comprising 1. a first file storage containing a plurality of memory cells,
2. means for automatically storing said set of data in order in the memory cells of said first file storage,
3. a second file storage containing a plurality of memory cells,
4. means for automatically storing a set of filter coefficients in order in the memory cells of said second file storage,
5. two separate read controls connected respectively to said first and second file storages for producing two separate signals in two separate channels, one from each of said file storages, directly responsive to the data in the memory cells of said file storages to which connection has been made,
6. a multiplier connected to said channels for producing the product of said two separate signals,
7. an accumulator connected to the output of said multiplier for summing a plurality of outputs of said multiplier,
8. means for automatically feeding back the output of said accumulator to store said output in said means 2) and simultaneously feeding said output of said apparatus, and
9. an automatic controller connected to and operating cyclically on said means 2) for selecting successive memory cells in said first file storage for storage of the output of said accumulator in accordance with a predetermined pattern.

2. Apparatus in accordance with claim 1 in which said means 2) stores said set of data in order of the subscripts into successive memory cells in said first file storage starting at the cell which is M+N units after the initial cell in said storage.

3. Apparatus in accordance with claim 2 in which said means 4) for storing said filter coefficients $a_i$ and $b_j$ stores said coefficients serially in the memory cells of said second file storage in the arrangement $-b_M$, $-b_{M-1}$, $-b_{M-2}$, . . . $-b_1$, $a_N$, $a_{N-1}$, $a_{N-2}$, . . . $a_o$.

4. Apparatus in accordance with claim 3 including in said automatic controller means connected to said read controls 5) for producing separately but simultaneously signals from the initial cells of said first file storage and said second file storage, then separately but simultaneously from the second cells of said first file storage and said second file storage, and so on, until the number of terms so produced from said second file storage equals the total number M+N+1 of filter coefficients stored in said second file storage.

5. Apparatus in accordance with claim 4 in which said means for producing signals separately but simultaneously is repeatedly initiated, and in which said controller means includes means for incrementing by one the number of the first memory cell in said first file storage relative to that in said second file storage after the production of each M+N+1 such signals and the feeding back of said accumulator output by means 8).

6. Apparatus in accordance with claim 5 including means in said automatic controller for adjusting said storing means 2) such that each output of said accumulator is stored in a memory cell in said first file storage in increasing serial order, the first of said outputs being stored in a cell the number of which is M units after the initial cell number.

* * * * *